(12) United States Patent
Guo et al.

(10) Patent No.: US 8,500,200 B2
(45) Date of Patent: Aug. 6, 2013

(54) CHILD SAFETY SEAT

(75) Inventors: Zheng-Wen Guo, Taipei (TW); Zong-Wang Cui, Taipei (TW)

(73) Assignee: Wonderland Nurserygoods Company Limited, Central (HK)

( * ) Notice: Subject to any disclaimer, the term of this patent is extended or adjusted under 35 U.S.C. 154(b) by 76 days.

(21) Appl. No.: 13/237,477

(22) Filed: Sep. 20, 2011

(65) Prior Publication Data
US 2012/0074746 A1 Mar. 29, 2012

(30) Foreign Application Priority Data
Sep. 28, 2010 (CN) .......................... 2010 1 0514029

(51) Int. Cl.
*A47C 1/00* (2006.01)

(52) U.S. Cl.
USPC ....................................... 297/250.1; 297/484

(58) Field of Classification Search
USPC .............................................. 297/250.1, 484
See application file for complete search history.

(56) References Cited

U.S. PATENT DOCUMENTS

| | | | | |
|---|---|---|---|---|
| 6,485,102 B1* | 11/2002 | Moffa et al. | ................... | 297/253 |
| 6,820,939 B1* | 11/2004 | Chen | .............................. | 297/484 |
| 7,246,853 B2* | 7/2007 | Harcourt et al. | ........... | 297/250.1 |
| 7,246,854 B2* | 7/2007 | Dingman et al. | .......... | 297/250.1 |
| 2006/0261651 A1* | 11/2006 | Nolan et al. | ................ | 297/250.1 |
| 2011/0057489 A1* | 3/2011 | Greene | ......................... | 297/253 |

* cited by examiner

*Primary Examiner* — David Dunn
*Assistant Examiner* — Timothy J Brindley
(74) *Attorney, Agent, or Firm* — Merchant & Gould P.C.

(57) ABSTRACT

A child safety seat includes an inner member, an outer member, and a support frame. The inner member has a seat part and a backrest part that extends upwardly from a rear end and lateral ends of the seat part. The outer member has a rear portion that is disposed behind the backrest part of the inner member, and a front portion that extends from a periphery of the rear portion and that is coupled to the inner member. The support frame includes a first subframe unit that is disposed behind and adjacent to the inner member and that is connected to the outer member, and a second subframe unit that extends between the inner and outer members from the first subframe unit.

11 Claims, 6 Drawing Sheets of# CHILD SAFETY SEAT

CROSS-REFERENCE TO RELATED APPLICATION

This application claims benefit of Chinese Application No. 201010514029.3, filed on Sep. 28, 2010 and which application is incorporated herein by reference. To the extent appropriate, a claim of priority is made to the above disclosed application.

BACKGROUND OF THE INVENTION

1. Field of the Invention

The invention relates to a child safety seat, more particularly to a child safety seat having good structural strength.

2. Description of the Related Art

A child safety seat is applied in an automobile for preventing a child who is seated thereon from being injured when the automobile is subjected to a collision. The child safety seat is generally placed on a seat of the automobile, while a seat belt of the automobile is buckled up to hold the child safety seat immobile and to restrain the child on the child safety seat during movement of the automobile. A conventional child safety seat generally has rigid wing segments extending forwardly and respectively from opposite lateral sides of a backrest thereof for preventing a direct lateral impact to the child seated on the conventional child safety seat. However, when the automobile is subjected to a severe impact, the seat belt will immediately stretch and the wing segments may be forced to collapse due to a pulling force resulted from the stretch of the seat belt, thereby providing room that allows the conventional child safety seat to be movable within the seat belt. Therefore, during the impact, the child seated on the conventional child safety seat may collide with an interior part of the automobile (e.g., the backrest of a front seat in front of the seat on which the conventional child safety seat is placed), and consequently be injured.

SUMMARY OF THE INVENTION

Therefore, the object of the present invention is to provide a child safety seat having a relatively great rigidity for resisting a severe impact.

Accordingly, a child safety seat of the present invention comprises an inner member, an outer member, and a support frame. The inner member has a seat part and a backrest part that extends upwardly from a rear end and lateral ends of the seat part. The outer member has a rear portion that is disposed behind the backrest part of the inner member, and a front portion that extends from a periphery of the rear portion and that is coupled to the inner member. The support frame includes a first subframe unit that is disposed behind and adjacent to the inner member and that is connected to the outer member, and a second subframe unit that extends between the inner and outer members from the first subframe unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
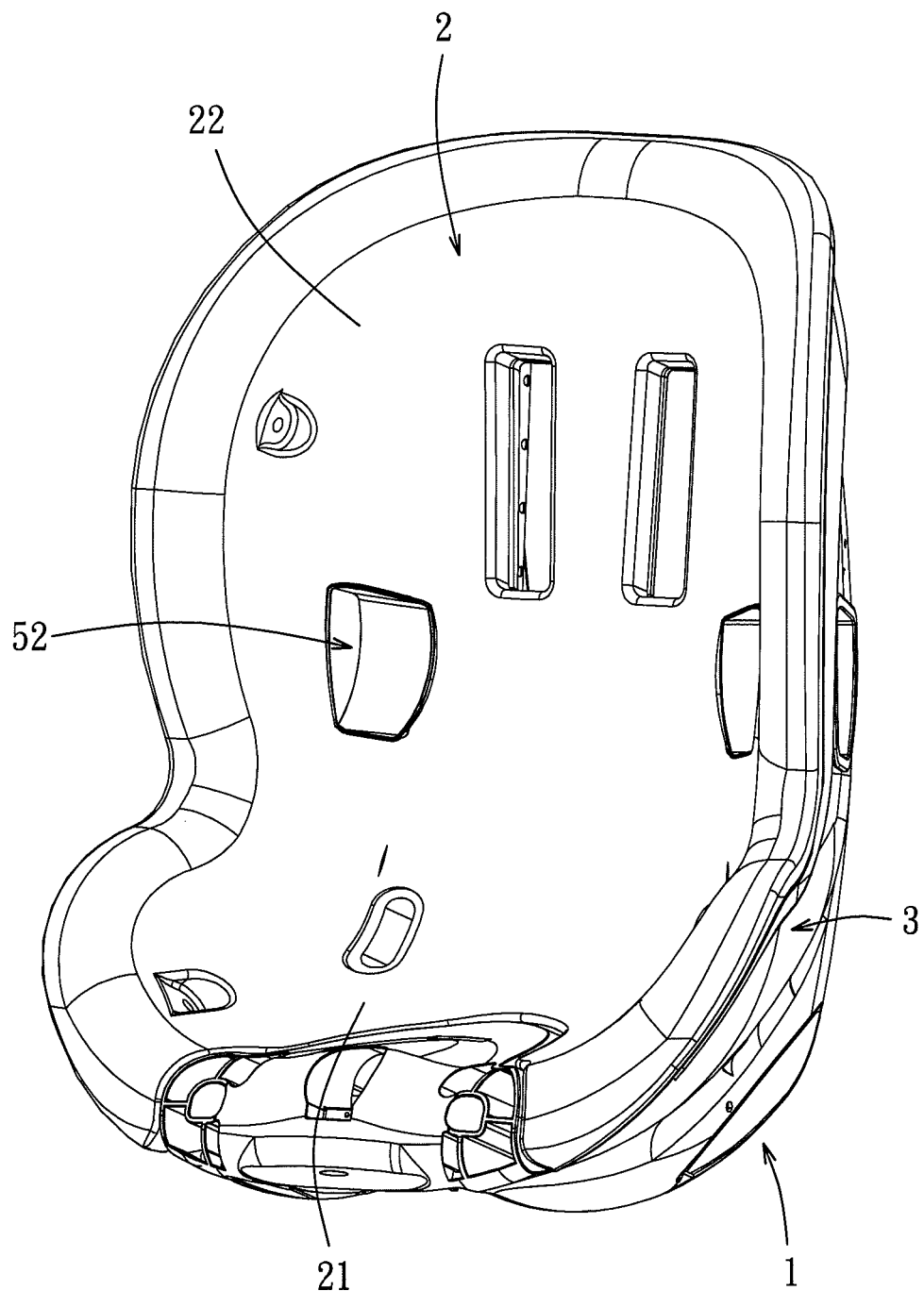
FIG. 1 is a perspective view of a preferred embodiment of a child safety seat according to the invention.
Figure 2:
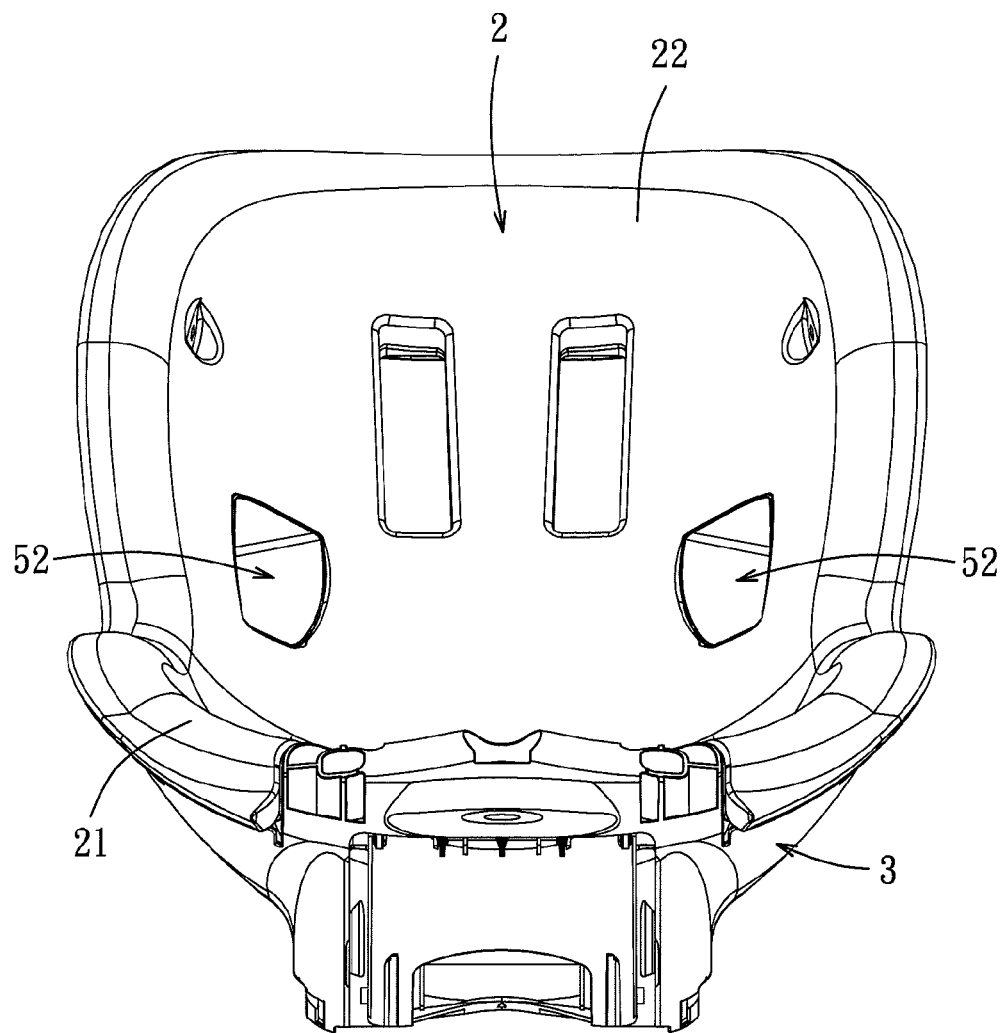
FIG. 2 is another perspective view of the preferred embodiment.

As shown in FIGS. 1 to 4, the preferred embodiment of a child safety seat 1 according to the present invention comprises an inner member 2, an outer member 3 and a support frame 10.

The inner member 2 is made integrally of a shock-absorbing material, such as foamed plastic (e.g. expandable polystyrene (EPS)). The inner member 2 has a seat part 21 and a backrest part 22 that extends upwardly from a rear end and lateral ends of the seat part 21. As further shown in FIG. 4, the outer member 3 is made integrally of hard plastic, is configured to correspond in shape to the inner member 2, and has a rear portion 31 and a front portion 32. The rear portion 31 is disposed behind the backrest part 22 of the inner member 2, and has a projecting section 33 at a top end thereof that projects toward the inner member 2. The projecting section 33 is configured as a rectangular projection, and includes a base wall 331, a pair of side walls 333 extending upwardly from opposite lateral ends of the base wall 331, and a top wall 332 parallel to the base wall 331 and interconnecting the side walls 333. The rear portion 31 further has a pair of through holes 60 formed in front of and adjacent to lateral ends of the base wall 331, respectively. The front portion 32 extends from a periphery of the rear portion 31 and is coupled to the inner member 2.

Figure 5:
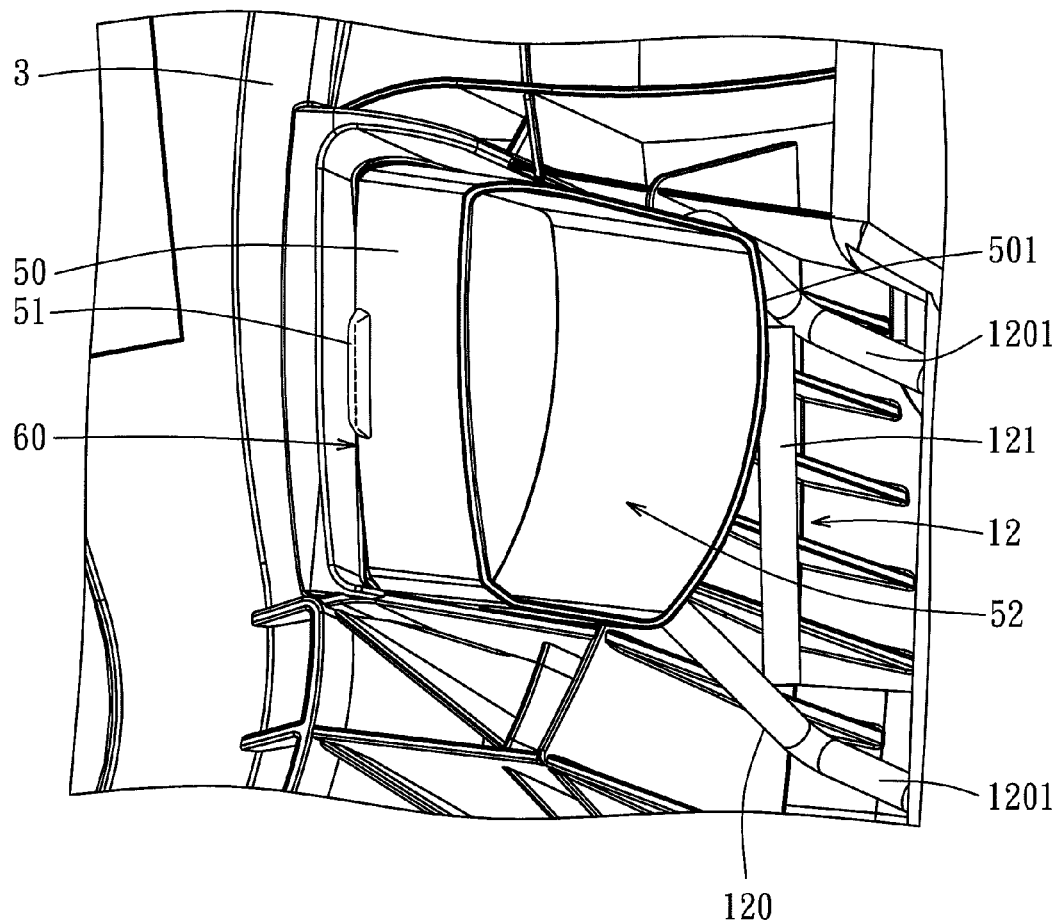
FIG. 5 is an enlarged fragmentary perspective view of the preferred embodiment, illustrating a tubular member.

The child safety seat 1 of this invention further comprises a pair of spaced-apart tubular members 50. Each of the tubular members 50 defines a substantially rectangular belt-extending space 52 (see FIG. 5), has a coupling section 51 secured to a periphery of a respective one of the through holes 60 of the front portion 32 of the outer member 3, and extends through the backrest part 22 of the inner member 2. A seat belt (not shown) of an automobile is thus permitted to extend through the belt-extending spaces 52 in order to hold firmly the child safety seat 1 on a seat of the automobile.

Figure 3:
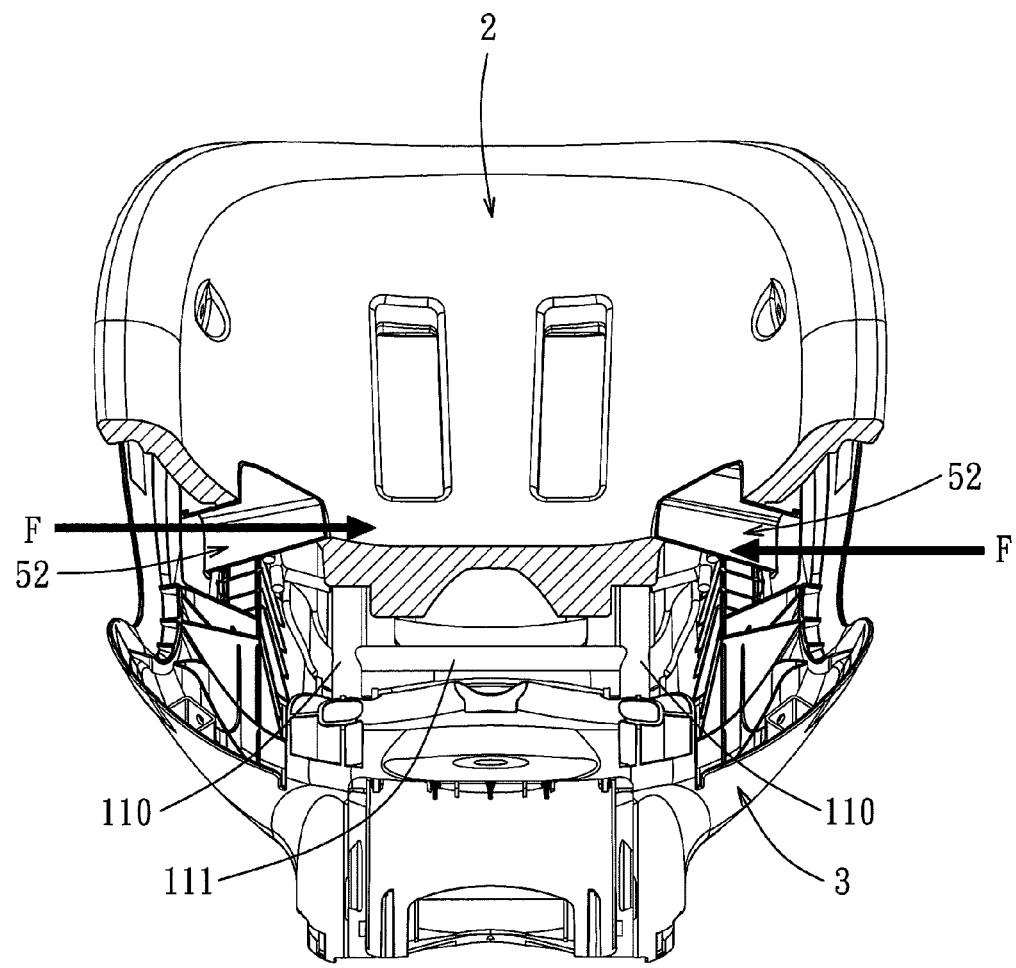
FIG. 3 is a partly cutaway perspective view of the preferred embodiment.
Figure 4:
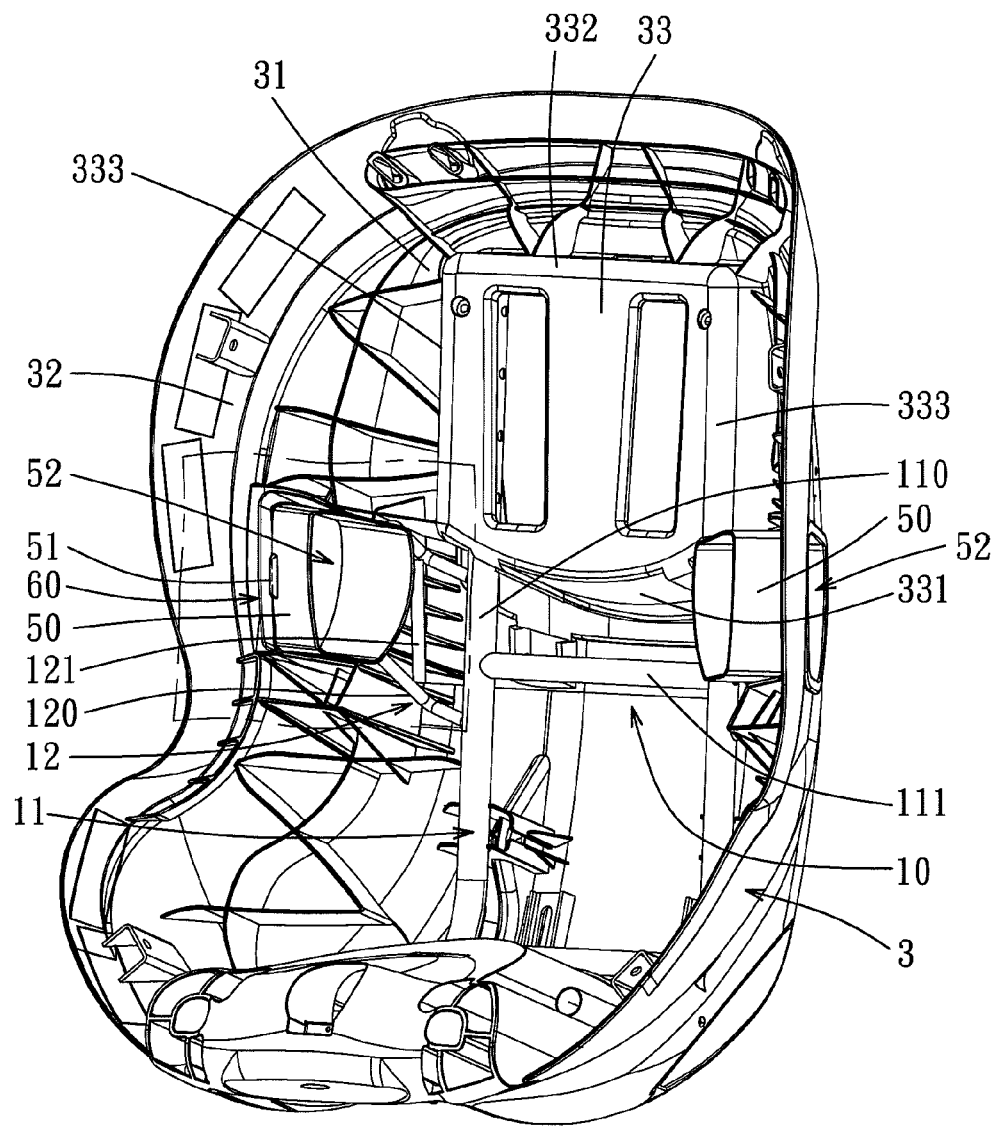
FIG. 4 is a perspective view of an outer member and a support frame of the preferred embodiment.
Figure 6:
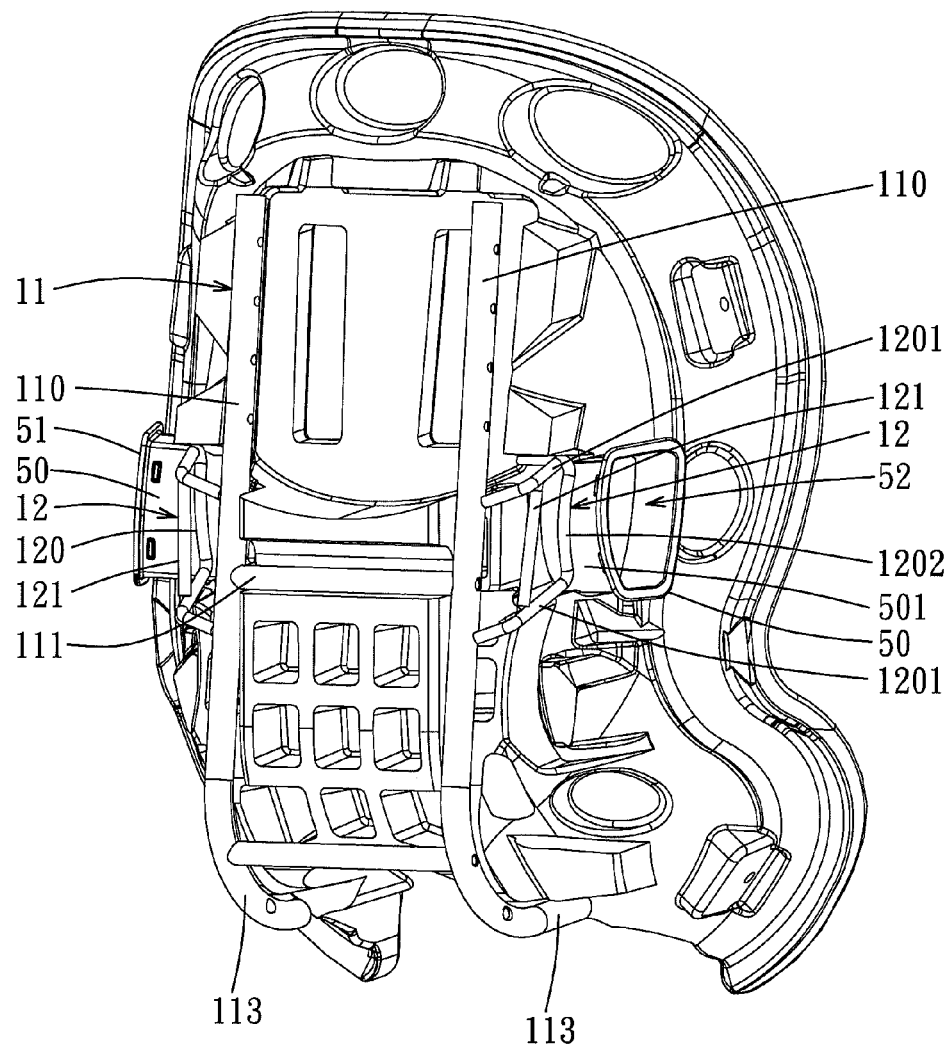
FIG. 6 is a perspective view of an inner member and the support frame of the preferred embodiment.

Referring back to FIG. 4 and further referring to FIGS. 3 and 6, the support frame 10 has a first subframe unit 11 and a second subframe unit 12. The first subframe unit 11 includes a pair of spaced-apart upright rod components 110 that are disposed behind and adjacent to the inner member 2 and that extend through the base wall 331 of the projecting section 33 so as to be positioned relative to the projecting section 33. Preferably, each of the upright rod components 110 has a bent end segment 113 that is formed at a lower end thereof, that extends substantially under the seat part 21 of the inner member 2, and that is connected to the outer member 3. In this embodiment, the first subframe unit 11 further includes a pair of transverse rod component 111 interconnecting the upright rod components 110. The second subframe unit 12 includes a pair of U-shaped rods 120 extending between the inner and outer members 2, 3 from the first subframe unit 11. Preferably, each of the U-shaped rods 120 has a pair side rod segments 1201 extending integrally from a respective one of the upright rod components 110 of the first subframe unit 11, and an intermediate rod segment 1202 interconnecting the side rod segments 1201. The second subframe unit 12 further includes a pair of connecting rods 121, each interconnecting the side rod segments 1201 of a respective one of the U-shaped rods 120. In this embodiment, each of the tubular members 50 has a rear wall 501 formed with a curved surface portion, and the intermediate rod segment 1202 of each of the U-shaped rods 120 has a curved configuration and abuts fittingly and firmly against the curved surface portion of the rear wall 501 of a respective one of the tubular members 50. Additionally, the first and second subframe units 11, 12 are preferably made of metal.

The abutment of the second subframe unit 12 against the tubular members 50 effectively enhances the lateral supporting rigidity of the tubular members 50. Therefore, when the automobile is subjected to a severe impact, the child safety seat 1 of this invention can resist lateral pulling forces (F) (see FIG. 3) that result from a stretch action of the seat belt without collapsing, thereby ensuring safety of a child seated thereon.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A child safety seat comprising:
    an inner member having
        a seat part, and
        a backrest part that extends upwardly from a rear end and lateral ends of said seat part;
    an outer member having
        a rear portion that is disposed behind said backrest part of said inner member, and
        a front portion that extends from a periphery of said rear portion and that is coupled to said inner member;
    a support frame including
        a first subframe unit that is disposed behind and adjacent to said inner member and that is connected to said outer member, and
        a second subframe unit that extends between said inner and outer members from said first subframe unit; and
    a pair of spaced-apart tubular members extending through said front portion of said outer member and said backrest part of said member;
    wherein said first subframe unit includes a pair of spaced-apart upright rod components; and
    wherein said second subframe unit includes a pair of U-shaped rods, each of which has
        a pair of side rod segments extending from a respective one of said upright rod components, and
        an intermediate rod segment interconnecting said side rod segments and abutting against a respective one of said tubular members.

2. The child safety seat as claimed in claim 1, wherein each of said tubular members has a coupling section secured to said rear portion of said outer member.

3. The child safety seat as claimed in claim 1, wherein said rear portion of said outer member has a projecting section projecting toward said inner member.

4. The child safety seat as claimed in claim 3, wherein:
    said projecting section of said rear portion of said outer member is configured as a rectangular projection and includes a base wall projecting toward said inner member, a pair of side walls extending upwardly from opposite lateral ends of said base wall, and a top wall parallel to said base wall and interconnecting said side walls; and
    said upright rod components extend through said base wall of said projecting section so as to be position said first subframe unit relative to said projecting section.

5. The child safety seat as claimed in claim 1, wherein each of said tubular members has a curved surface portion, and said intermediate rod segment of each of said U-shaped rods of said second subframe unit has a curved configuration so as to abut fittingly against said curved surface portion of the respective one of said tubular members.

6. The child safety seat as claimed in claim 1, wherein said first subframe unit further includes at least one transverse rod component interconnecting said upright rod components.

7. The child safety seat as claimed in claim 1, wherein said second subframe unit further includes a pair of connecting rods, each of which interconnects said side rod segments of a respective one of said U-shaped rods.

8. The child safety seat as claimed in claim 1, wherein each of said upright rod components of said first subframe unit has a bent end segment that is formed at a lower end thereof, that extends substantially under said seat part of said inner member, and that is connected to said outer member.

9. The child safety seat as claimed in claim 1, wherein said first and second subframe units are made of metal.

10. The child safety seat as claimed in claim 1, wherein said second subframe unit extends integrally from said first subframe unit.

11. The child safety seat as claimed in claim 1, wherein said outer member is made of hard plastic, and said inner member is made of foamed plastic.

* * * * *